US 9,839,079 B2

(12) United States Patent
Wee et al.

(10) Patent No.: US 9,839,079 B2
(45) Date of Patent: Dec. 5, 2017

(54) DIMMER SYSTEM AND METHOD

(71) Applicant: OPULENT ELECTRONICS INTERNATIONAL PTE LTD, Singapore (SG)

(72) Inventors: Francis Kai Fook Wee, Singapore (SG); Soon Thiam Chan, Batu Maung (MY); Chye Boon Tan, Tanjong Bungah (MY)

(73) Assignee: OPULENT ELECTRONICS INTERNATIONAL PTE LTD, Singapore (SG)

( * ) Notice: Subject to any disclaimer, the term of this patent is extended or adjusted under 35 U.S.C. 154(b) by 0 days.

(21) Appl. No.: 15/103,864

(22) PCT Filed: Jan. 16, 2015

(86) PCT No.: PCT/SG2015/050004
§ 371 (c)(1),
(2) Date: Jun. 11, 2016

(87) PCT Pub. No.: WO2015/108489
PCT Pub. Date: Jul. 23, 2015

(65) Prior Publication Data
US 2016/0302273 A1    Oct. 13, 2016

(30) Foreign Application Priority Data
Jan. 16, 2014 (SG) .................... 2014003602

(51) Int. Cl.
*H05B 37/02* (2006.01)
*H05B 33/08* (2006.01)

(52) U.S. Cl.
CPC ...... *H05B 33/0815* (2013.01); *H05B 33/0851* (2013.01); *H05B 33/0854* (2013.01);
(Continued)

(58) Field of Classification Search
CPC ........... H05B 33/0809; H05B 33/0815; H05B 33/0845; H05B 33/0854; H05B 37/0218;
(Continued)

(56) References Cited

U.S. PATENT DOCUMENTS 5,751,118 A    5/1998 Mortimer
7,745,959 B2   6/2010 King, Jr. et al.
(Continued)

FOREIGN PATENT DOCUMENTS

WO    2012176097 A1    12/2012
WO    2013066270 A1    5/2013

OTHER PUBLICATIONS

PCT/SG2015/05004 International Search Report & Written Opinion.
Extended European Search Report of European Patent Application No. 15737707.8 dated Sep. 1 2017.

*Primary Examiner* — Tung X Le
(74) *Attorney, Agent, or Firm* — Joseph G. Chu; JCIP

(57) ABSTRACT

A dimmer system comprising a dimmer having an input interface arranged to receive at least one input for dimming and an output interface for transmitting processed dimming input to at least one LED driver; wherein each of the at least one LED driver is operable to drive a plurality of high powered LED lamp units.

17 Claims, 8 Drawing Sheets

(52) U.S. Cl.
CPC ..... *H05B 37/0218* (2013.01); *H05B 37/0227* (2013.01); *H05B 37/0281* (2013.01)

(58) Field of Classification Search
CPC ............ H05B 37/0227; H05B 37/0254; H05B 37/0281
USPC .......................... 315/152, 294, 307, 312, 360
See application file for complete search history.

(56) References Cited

U.S. PATENT DOCUMENTS

| | | | |
|---|---|---|---|
| 2004/0085030 A1* | 5/2004 | Laflamme .......... | H05B 33/0863 315/291 |
| 2005/0225976 A1* | 10/2005 | Zampini ................ | B63B 45/04 362/227 |
| 2009/0167207 A1* | 7/2009 | Zimmermann .... | H05B 33/0848 315/294 |
| 2011/0140611 A1 | 6/2011 | Elek et al. | |
| 2012/0091910 A1* | 4/2012 | Zhang ................ | H05B 33/0815 315/287 |
| 2013/0147367 A1 | 6/2013 | Cowburn | |
| 2014/0312782 A1* | 10/2014 | Manor .................. | H05B 37/02 315/155 |
| 2015/0028776 A1* | 1/2015 | McMillan .......... | H05B 33/0809 315/307 |

* cited by examiner

DIMMER SYSTEM AND METHOD

FIELD OF INVENTION

The invention relates to a dimmer system and method. The invention is especially suited (but not limited) for use in high-powered LED lamp unit systems and will be described in such context.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

LED lighting is advantageous over conventional lighting systems due to the less electrical energy consumed per lumen. However, LED lighting system requires proper control or regulation of electrical current and/or electrical voltage. Most LED lamp systems are driven by electrical drivers that are typically voltage and/or current regulators adapted to suit the voltage and current requirements of LED loads.

Conventional LED drivers may incorporate dimmers (dimmer circuitry) for the control of brightness of LED loads (such as LED lamps) or the switching of the LED lamps on or off. Dimmer protocols include pulse wave modulation (PWM), 1-10V/0-10V VDC dimmer protocol, Potentiometer, and Motion sensor protocol. Potentiometer and Motion sensor are devices widely used for lighting dimming control.

Most conventional dimming systems are binary on/off system and do not allow flexibility in dimming to the required light brightness levels. For example, motion sensor for conventional dimming system is based on the binary On/Off.

Further, for implementation on circuits with primary and secondary sides, dimmers are usually designed with the rectifying side (on the primary). Dimmers at the primary AC side are achieved based on phase cut which will create electromagnetic interference (EMI). Due to EMI, the power factor of these circuits in operation will be affected adversely by a factor of 0.3 to 0.5, resulting in relatively higher distortion compared to non-dimmer controlled system.

Due to the demands for high powered LED lamps, for LED lamp systems comprising one or more high powered LED lamps, each LED lamp is typically controlled by a separate driver. High-powered LED lamps include, but are not limited to down lights; MR16; GU10; flood lamps etc. In such LED lamp systems, AC dimmers may be designed on the primary side, but will have to be in electrical communication with all LED drivers in the system. This is often complex and there will be greater distortion due to EMI may result as more and more high-powered LED lamps (and drivers) get added to the system.

It is an object of the invention to at least alleviate one or more of the above problem(s).

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

The present invention is related to the device that integrates the lighting dimming protocol interface such as PWM, 1-10V/0-10V Potentiometer and Motion Sensor control in a single dimmer device, called "Dimming Hub". Any user could connect the dimming devices to the Dimming Hub according to the dimming protocol used for lighting control purpose. The Dimming Hub provides more flexibility to users on the different protocols dimming devices selection for lighting control.

In accordance with a first aspect of the invention there is dimmer system comprising an input interface capable of receiving dimming input from at least two dimming protocols; an input processer for determining the dimming protocol of the received dimming input and process the dimming input according to the dimming protocol; an output interface comprising a plurality of output ports, at least one output port adapted to transmit the processed dimming input (output of the input processor) to at least one LED driver; wherein each of the at least one LED driver is operable to drive a plurality of high powered LED lamp units at a desired brightness in accordance with the dimmer input.

Preferably, the input interface comprises at least two of the following: motion control module; pulse wave modulation module; and potentiometer module.

Preferably, the output interface comprises a plurality of RJ45 Ethernet modular connectors.

Preferably, where the input interface comprises a motion control module, the motion control module comprises a timer for determining the duration the high-powered LED drivers are to remain at a desired brightness.

Preferably, the input processor comprises a pulse wave modulation (PWM) convertor and in operation, upon receiving a duty cycle to operate the PWM converter, the PWM signal is converted to an operating direct current (DC) voltage and sent to the output interface.

Preferably, the operating DC voltage after conversion is around 1.5 to 5 volts.

Preferably, the dimmer input comprises a pulse wave modulation (PWM) signal having a range of frequencies.

Preferably, the PWM signal frequencies at 100 HZ to 2 KHZ is determined as a normal PWM signal; and the PWM signal frequencies detected at 25 Hz to 80 Hz is determined as a motion sensor signal.

Preferably, the PWM signal frequencies at 100 HZ to 2 KHZ is determined as a normal PWM signal; and the PWM signal frequencies detected at 2.5 KHz to 3 KHz is determined as a motion sensor signal.

Preferably, any DC component within the PWM signal is disregarded by the input processor.

Preferably, the plurality of dimmer inputs comprises a potentiometer signal between 1 to 10 volts.

Preferably, any AC component within the potentiometer signal is disregarded by the input processor.

Preferably, an output port of the output interface is connected to another dimmer system.

In accordance with a second aspect of the invention there is a LED driver comprising a dimmer system according to the previous aspect, wherein the LED driver comprises a non-isolated configuration and the dimmer system is implemented on a secondary end.

In accordance with a third aspect of the invention there is a LED driver comprising a dimmer system according to according to the previous aspect, wherein the LED driver comprises a isolated configuration and the dimmer is implemented on a secondary end.

In accordance with a fourth aspect of the invention there is a method for processing and providing dimming signals to an electrical output comprising the steps of receiving dimming input from at least two dimming protocols; determining the dimming protocol of the received dimming inputs and processing the dimming input according to the dimming protocol; transmitting the processed dimming input to at least one LED driver for dimming; wherein each of the at least one LED driver is operable to drive a plurality of high powered LED lamp units at a desired brightness in accordance with the dimmer input.

BRIEF DESCRIPTION OF THE DRAWINGS

In the figures, which illustrate, by way of example only, embodiment(s) of the present invention, wherein

FIG. 8a shows PWM inputs; FIG. 8b shows a 10V potentiometer input; and FIG. 8c shows a motion detect input.

Other arrangements of the invention are possible and, consequently, the accompanying drawings are not to be understood as superseding the generality of the preceding description of the invention.

DETAILED DESCRIPTION OF THE EMBODIMENT(S)

In accordance with an embodiment of the present invention there is a dimmer 10 comprising an input interface 20 and an output interface 30. The dimmer 10 is suited, but not limited to be used for controlling the brightness of a plurality of electrical load, such as, but not limited to high-powered LED lamp units.

Input interface 20 is operable to receive input dimming signals for switching LED lamp units ON/OFF and/or adjusting the brightness of the LED lamp units.

Output interface 30 is operable to output processed input signal(s), the resulting output signals for feeding into:
i. Another dimmer 10; and/or
ii. A plurality of LED drivers.

Output interface 30 may comprise a plurality of RJ45 Ethernet modular connectors.

The dimmer 10 is hereinafter referred to as 'Dimming Hub'. The dimming hub is suitably powered by a power supply system 40.

Figure 1:
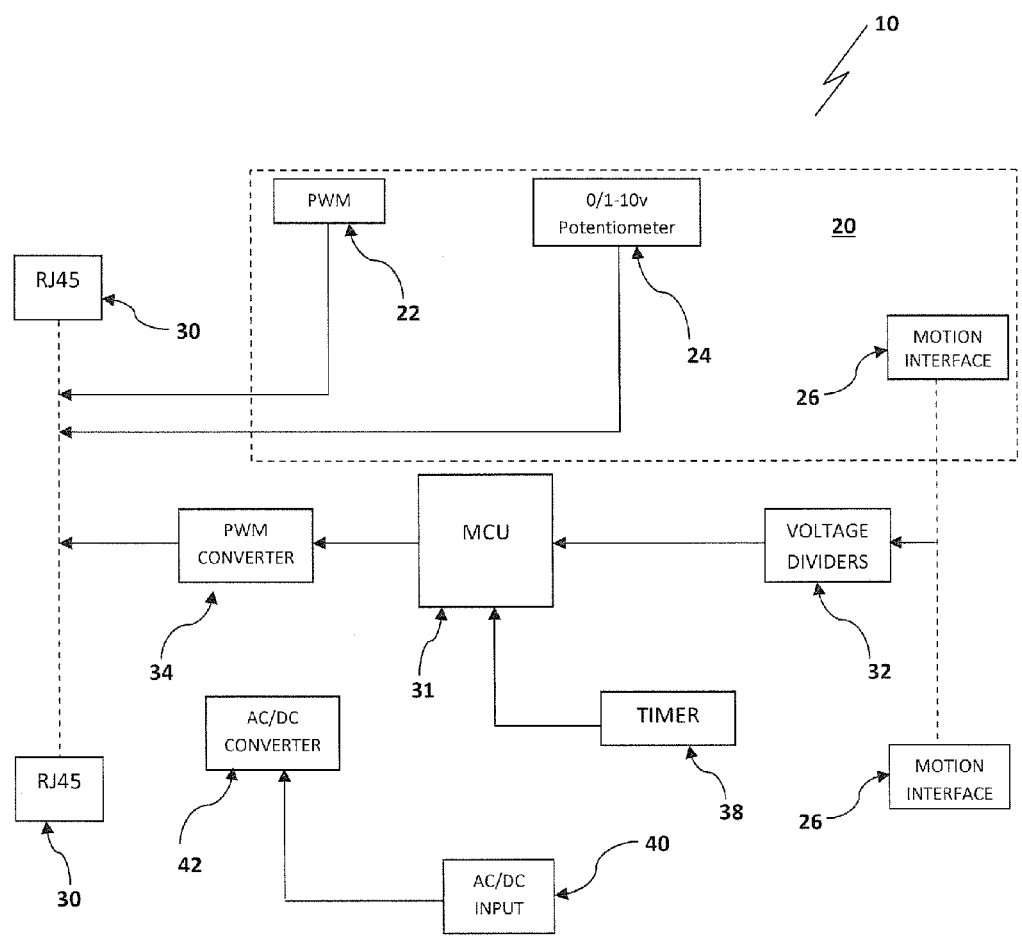
FIG. 1 is a schematic block diagram of the dimmer system in accordance with an embodiment of the invention.

FIG. 1 illustrates a block diagram of the Dimming Hub with input interface 20 operable to receive different dimmer protocols for LED lighting dimming and On/Off control. The Dimming Hub is powered by a power supply 40.

Power supply 40 is adapted to receive input voltage in the form of AC or DC voltage. Power supply 40 is electrically connected to an AC/DC convertor 42. If the input voltage is an AC voltage, the AC/DC converter 42 is operable to convert the received AC voltage to a DC voltage via rectification or other regulation means as known to a skilled person to drive the electronics circuits. If the input is a DC voltage, then the AC/DC converter 42 is operable to regulate the DC voltage. AC/DC convertor 42 may be an integrated circuit such as the AMEL5-12SAZ 5 Watt AC-DC Converter by AIMTEC™.

Power supply 40 comprises necessary electrical components such as rectifiers, capacitors and/or inductors to perform the necessary functions. Such electrical components are known and will not be elaborated further. It is to be appreciated that the dimming input and output interfaces 20, 30 are at the secondary end of the implemented circuit in either an isolated or a non-isolated configuration. Such design ensures that power factor is maintained.

The input interface 20 is adapted to receive inputs from
a. a PWM module 22 for PWM signal input;
b. Potentiometer module 24 for 0-10V or 1-10V variability; and/or
c. motion sensor interface 26 for receiving motion sensor inputs.

The PWM module 22 accepts PWM frequency in the range of 100 Hz to 2 KHz corresponding to 0 to 100% duty cycle respectively. A 0% duty cycle corresponds to the 'OFF' state, while 100% duty cycle corresponds to the desired light output level.

The PWM module 22 signal is processed and routed to the one or more output RJ45 connectors which are connected to LED drivers for lighting dimming or On/Off control.

Potentiometer 24 is an interface input preferably for 0-10V; 1-10V or other range of voltages as desired. The received potentiometer signal is routed to one or more output RJ45 connectors that are connected to LED drivers for lighting dimming or On/Off control. 0V is considered as a switch off state, i.e. lighting OFF, and 10V is 100% level light output.

The motion sensors interface 26 may comprise single or multiple motion sensors 28 for connection with motion detectors to control the dimming of LED drivers. Any motion sensor 28 that operates with 'default mode' that is comprises an output type of a 'normal close' output is compatible.

Figure 2:
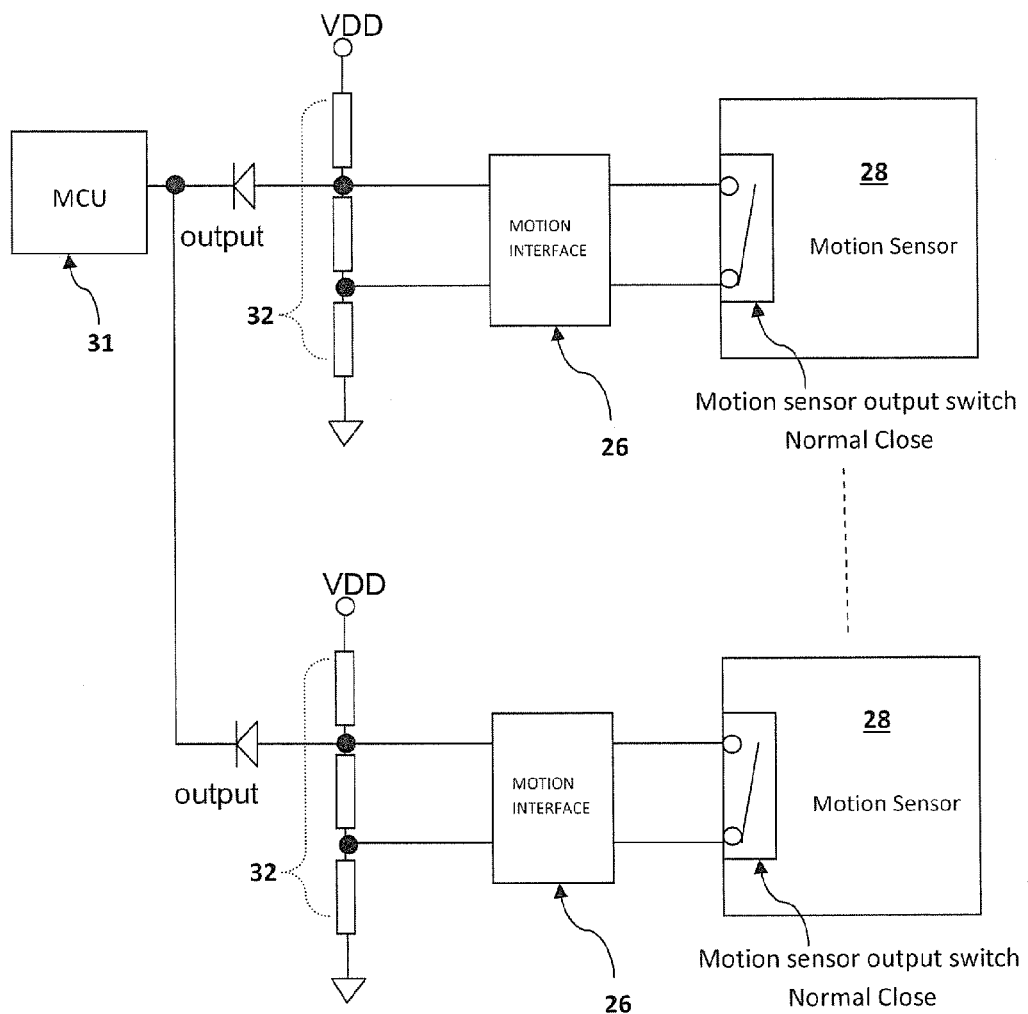
FIG. 2 is a schematic block diagram of an example of the motion sensor circuitries.
Figure 3:
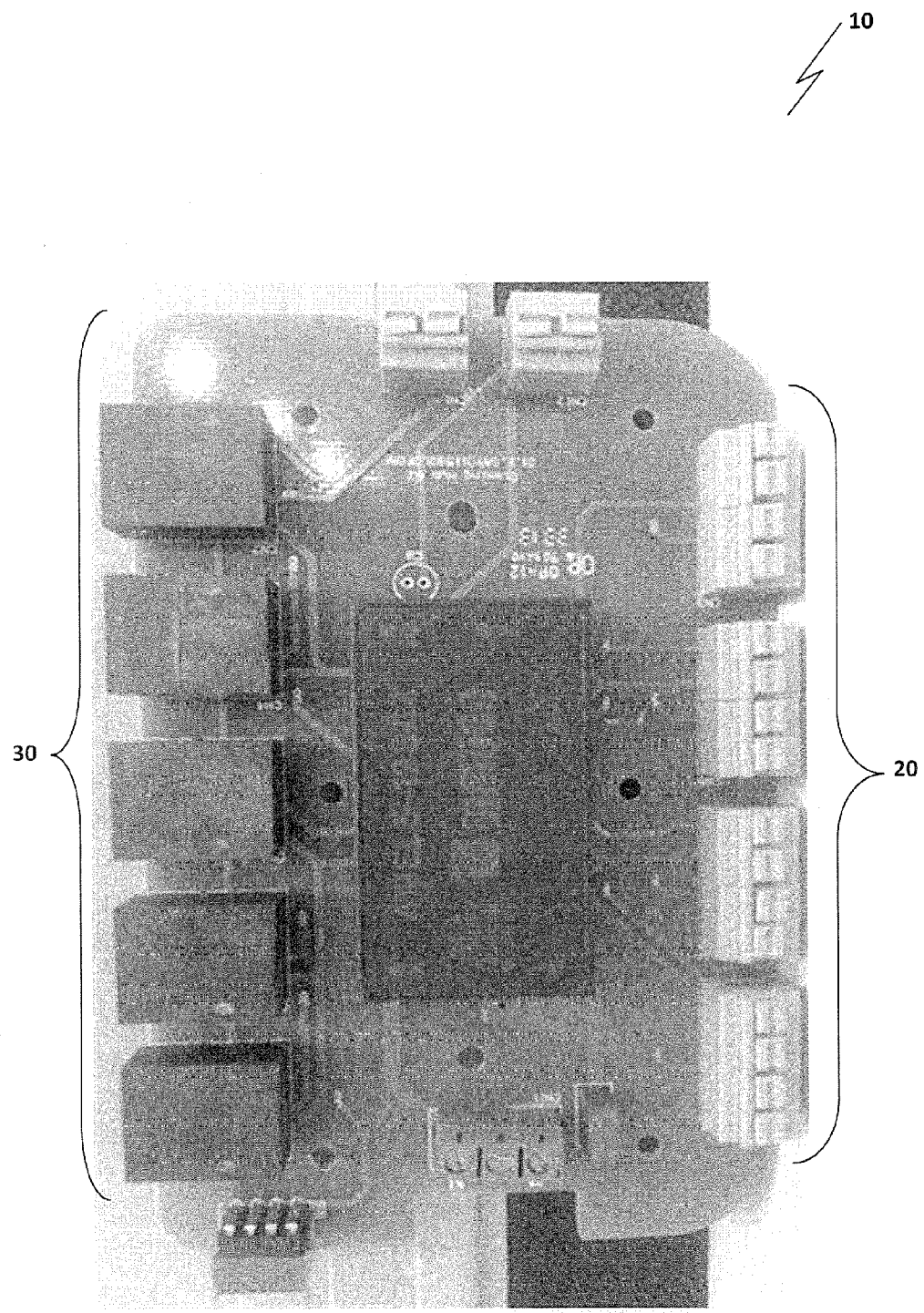
FIG. 3 shows a possible circuit implementation of the dimmer system of FIG. 1.

FIG. 2 illustrates the motion sensor interface 26 in the form of a logic block diagram. It includes an input processor 31 (main control unit MCU 31), voltage dividers 32, and output interface 30 RJ45.

The logic associated with the operation of the motions sensors are described as follows:

When no motion inputs are detected, motion sensors output switches are closed, and the voltage level at the voltage dividers 32 will change. Once the change in voltage is detected by MCU 31, the MCU 31 will sense that there is no motion detected. MCU 31 will then send out a range of PWM duty cycle to a PWM converter 34. PWM convertor 34 then converts PWM signal to an operating DC voltage and send it to the output interface RJ45, and LED drivers connected to the output interface shall dim at the same time. The operating DC voltage after the PWM converter 34 is around 1.5~5V DC.

When motion sensor interface 26 detects motion, the motion sensor switch will open circuit, this will again change the voltage level at output of the voltage dividers 32, MCU 31 will sense the change in voltage level and know that motion was detected and send out a range of PWM duty cycle to PWM converter 34, PWM converter 34 then converts PWM signal to DC voltage and send it through RJ45, and LED drivers connected to the output interface shall light up at the same time.

Multiple units of motion sensors 28 may be connected to the motion sensor interface 26 to widen the detection area. In such a situation, as long as one of the motion sensor detects any motion, the motion sensor switch will opened, and this will change the voltage level at output of the voltage dividers 32, MCU 31 will sense and know that motion detected and send out a range of PWM duty cycle to PWM converter 34, PWM converter 34 than converts PWM signal a corresponding DC voltage and send it through RJ45 30, those LED drivers connected will light up 100% at the same time.

When motion sensor detects the motion, in a default mode the motion sensor output switch open for few seconds and the motion sensor output switch is then closed back. A suitable timer 38 may be incorporated in the dimmer circuit to allow a user to select a desired light up time of the LED lamps when motion is detected. In this situation, For example, if TIMER 38 is set to 5 minutes of holding (light up) time, when motion sensor detects the motion, the motion sensor switch will be opened and this will change the voltage level at the output of the voltage dividers 32, the MCU 31 will sense and know that motion is detected and then send out a range of PWM duty cycle to PWM convertor 34, PWM convertor 34 will then convert PWM signal to DC voltage and send it through the RJ45, the connected LED drivers will then be operable to light up 100% with 5 minutes of holding time.

RJ45 is an interface output signal to LED drivers for dimming or On/Off lighting control. It can be single unit or multiple LED driver connection. The Dimming Hub can be link to another Dimming Hub for more LED driver control in the same time used Ethernet cable connection.

It is to be appreciated that additional inputs may be added to the input interface 20. These additional inputs include, but are not limited to, ambient lighting sensors (for automatically switching on/off or adjusting the brightness depending on ambient light); and variants of PWM control such as PWM to Digital Addressable Lighting Interface (DALI); PWM to Bluetooth; (DALI) to PWM; and Bluetooth to PWM etc.

In accordance with another embodiment of the invention, the dimmer 10 may comprise an integrated (common) input interface 200 arranged to receive at least three forms of input signals:
a. a PWM module 22 for PWM signal input;
b. Potentiometer module 24 for 0-10V or 1-10V variability; and
c. motion sensor interface 26 for receiving motion sensor inputs.

Figure 4:
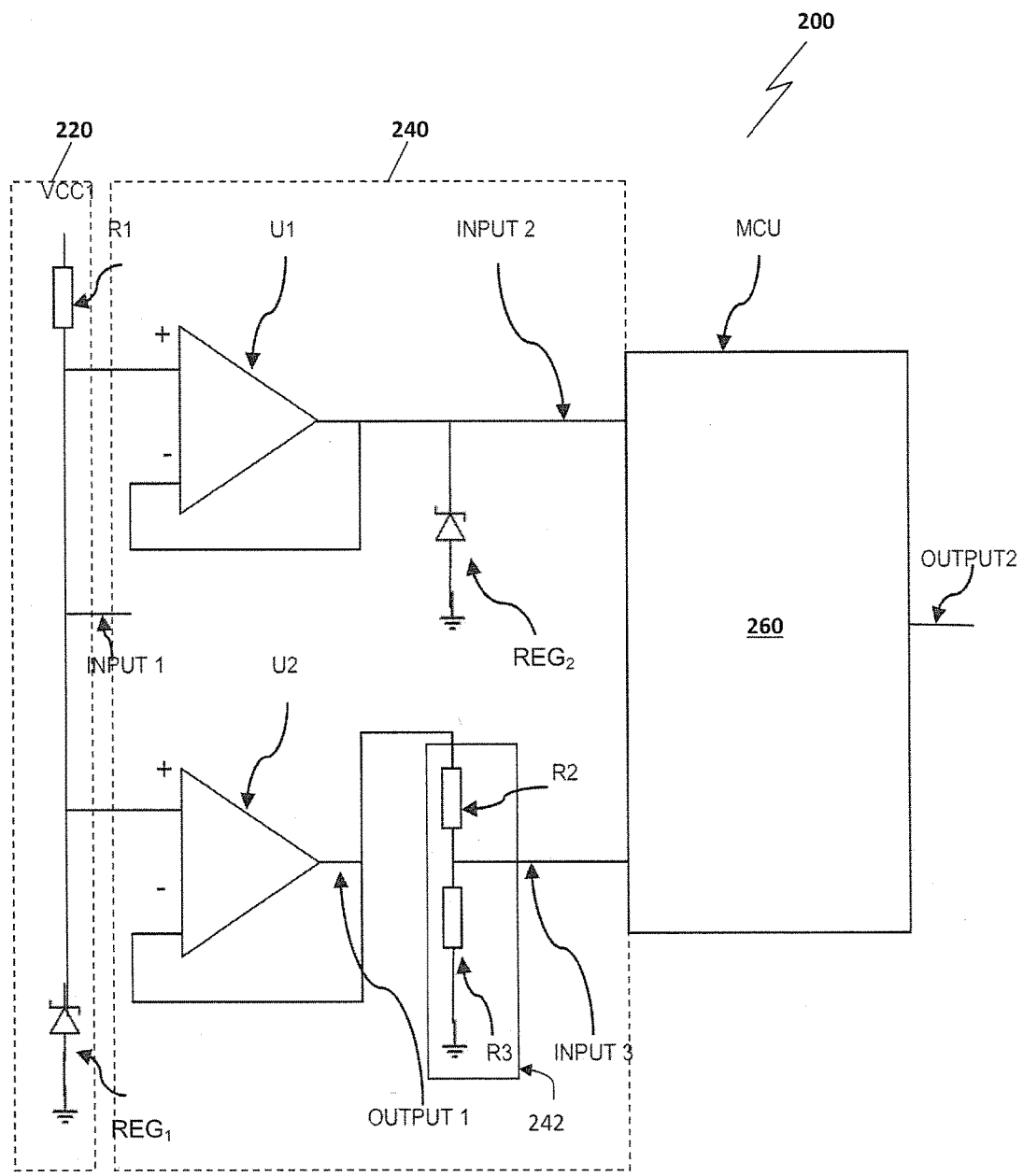
FIG. 4 is a circuit diagram of an example of the integrated input interface in accordance with an embodiment of the invention.

A circuit diagram 200 of the input interface is shown in FIG. 4. The input interface 200 comprises an input line 220, an input signal regulation unit 240, and an input processor or main control unit (MCU) 260.

Input line 220 comprises a single input INPUT 1 for receiving any input signals from a PWM module 22, a Potentiometer module 24, or a motion sensor interface 26; a resistor element $R_1$; and a voltage regulator $Reg_1$.

The resistor element $R_1$ functions as a pull high resistor when there are no dimming devices such as PWM, 0-10V/VR or Motion Sensor connected to the input interface 200. $R_1$ also works as pull high resistor to INPUT 2, INPUT 3 when no dimming inputs are present.

Voltage regulator $Reg_1$ is operable to regulate INPUT 1 at a desired voltage level to prevent damage to the electrical components within the input interface 200.

Upon receiving a dimming signal at INPUT 1, the dimming signal is tapped as inputs to the input signal regulation unit 240. The input signal regulation unit 240 comprises voltage followers (buffer amplifier) U1 and U2; Regulator $Reg_2$; and voltage divider 242.

Upon receipt of dimming signal at INPUT 1, voltage followers U1 and U2 are operable to follow the INPUT 1 voltage to provide INPUT 2 and INPUT 3.

INPUT 2 is used for the detection of PWM signal or motion sensor signal. INPUT 3 is used for the detection of the 0-10V or 1-10V input.

The INPUT 2 is regulated by the Voltage regulator $Reg_2$. Similar to $Reg_1$, $Reg_2$ is operable to regulate INPUT 2 at a desired voltage level to prevent damage to the electrical components within the input interface 200.

The voltage divider 242 regulates the voltage at INPUT 3. Voltage divider 242 comprises resistors $R_2$ and $R_3$ for performing the voltage dividing functions.

As an illustration, when a 0-10V/VR potential meter input is connected and set to 10V feed to INPUT 1, the voltage follower U2 and OUTPUT 1 voltage will be 10V as well. R2 and R3 working as divider will set the voltage at INPUT 3 equal or less than 5V to ensure INPUT 3 voltage level not over or higher than MCU working voltage.

The MCU 260 implements the logic and algorithm (in the form of programming code) to detect and differentiate the different types of INPUT 1, in particular differentiating whether INPUT 1 is a PWM signal; voltage 0-10V, 1-10V/VR input; or motion sensor input. The output of MCU 260 is OUTPUT 2. OUTPUT 2 is sent to a LED driver for lighting dimming control.

The basic logic for detection and differentiation of INPUT 1 is described with reference to the flow chart in FIG. 5.

INPUT 2 is utilized for the detection of PWM signal. Any DC voltages are filtered and ignored.

Upon receiving a PWM signal having a range of frequencies:
any PWM signal frequencies detected at 100 HZ to 2 KHZ is considered as normal PWM signal; and
any PWM signal frequencies detected at 25 Hz to 80 Hz; OR 2.5 KHz to 3 KHz are deemed as Motion Sensor signal.

The MCU 260 will then send the dimming signal to the LED driver (presumably an ASIC based LED driver) for lighting dimming control.

INPUT 3 is utilized for the detection of DC voltage level for 0-10V/VR dimming protocol. Any PWM signal is filtered or disregarded.

When a 0-10V/VR input is connected, the maximum voltage at INPUT 1 is set at 10V, and the voltage regulator $REG_2$ will regulate the voltage to 5V or less at INPUT 2. However MCU 260 will ignore the voltage that detected at INPUT 2.

At the same time OUTPUT 1 (the output from voltage follower U2) will have the same voltage as INPUT 1. R2, R3 will divide the voltage range at 0V to 5V at INPUT 3. MCU 260 will recognize this is valid signal, process and send the output through OUTPUT 2 to the LED driver for lighting dimming control.

When a PWM input is connected, PWM signal that goes to INPUT 3, MCU 260 will ignore the PWM signal, with no change on the OUTPUT 2. MCU 260 will only recognize the PWM signal at INPUT 2, OUTPUT 2 will change the output signal accordingly to the LED driver for lighting dimming control.

Figure 5:
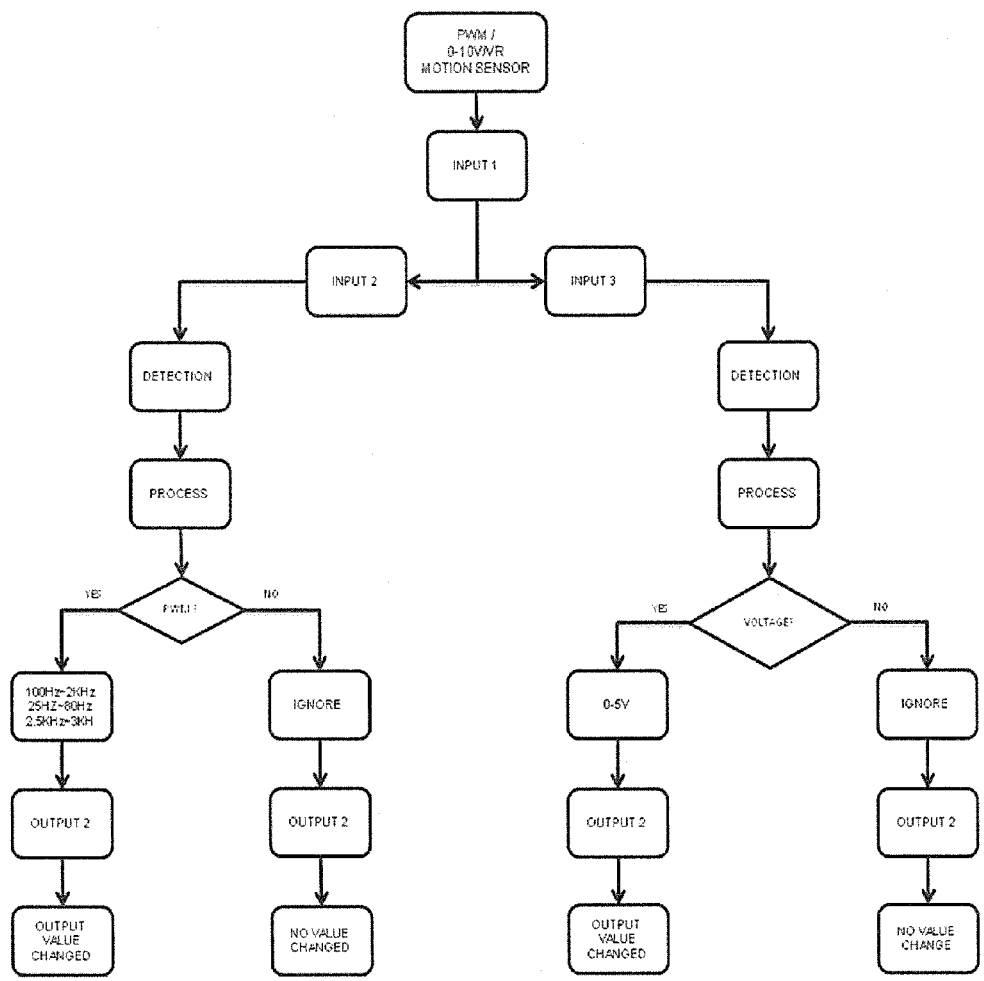
FIG. 5 is a flow chart showing the decision making process in the MCU of the integrated input interface of FIG. 4.
Figure 6:
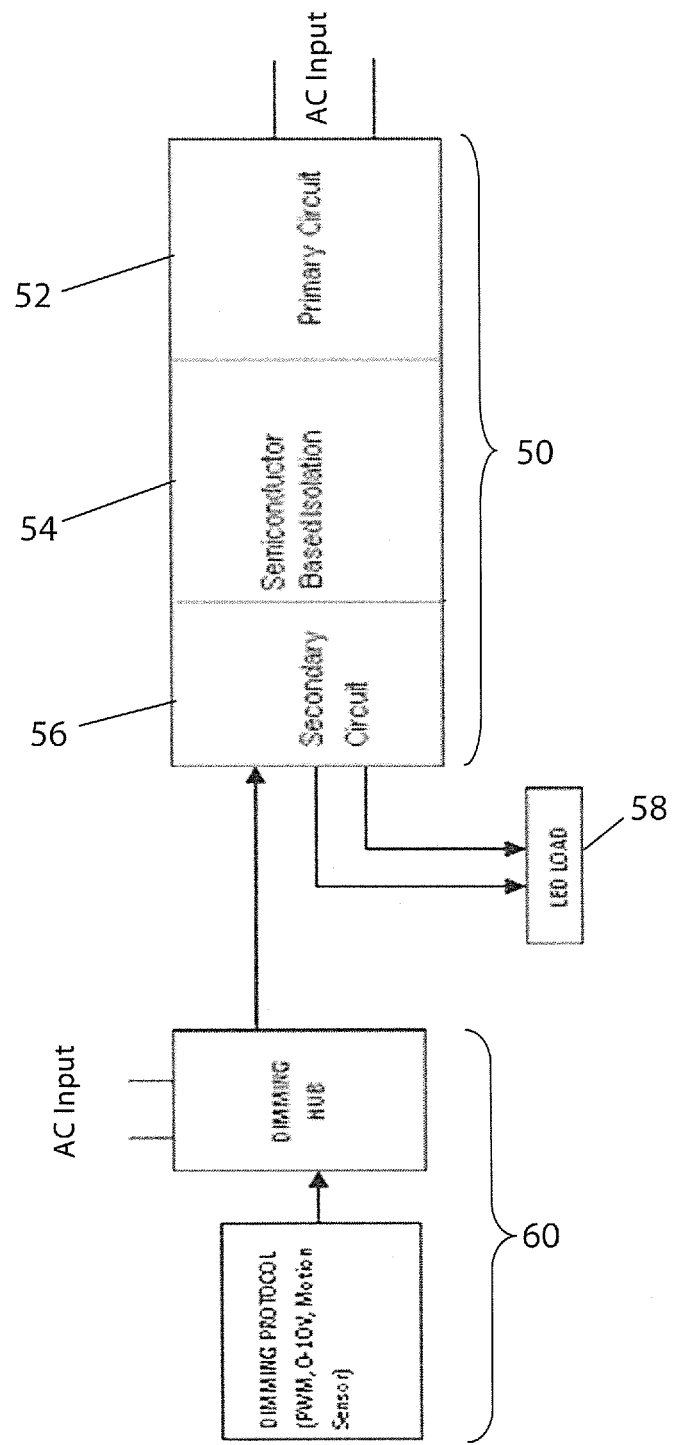
FIG. 6 illustrates is a schematic block diagram of how the dimmer may be coupled with a LED driver in an isolated configuration for dimming an LED load in accordance with another embodiment of the invention.
Figure 7:
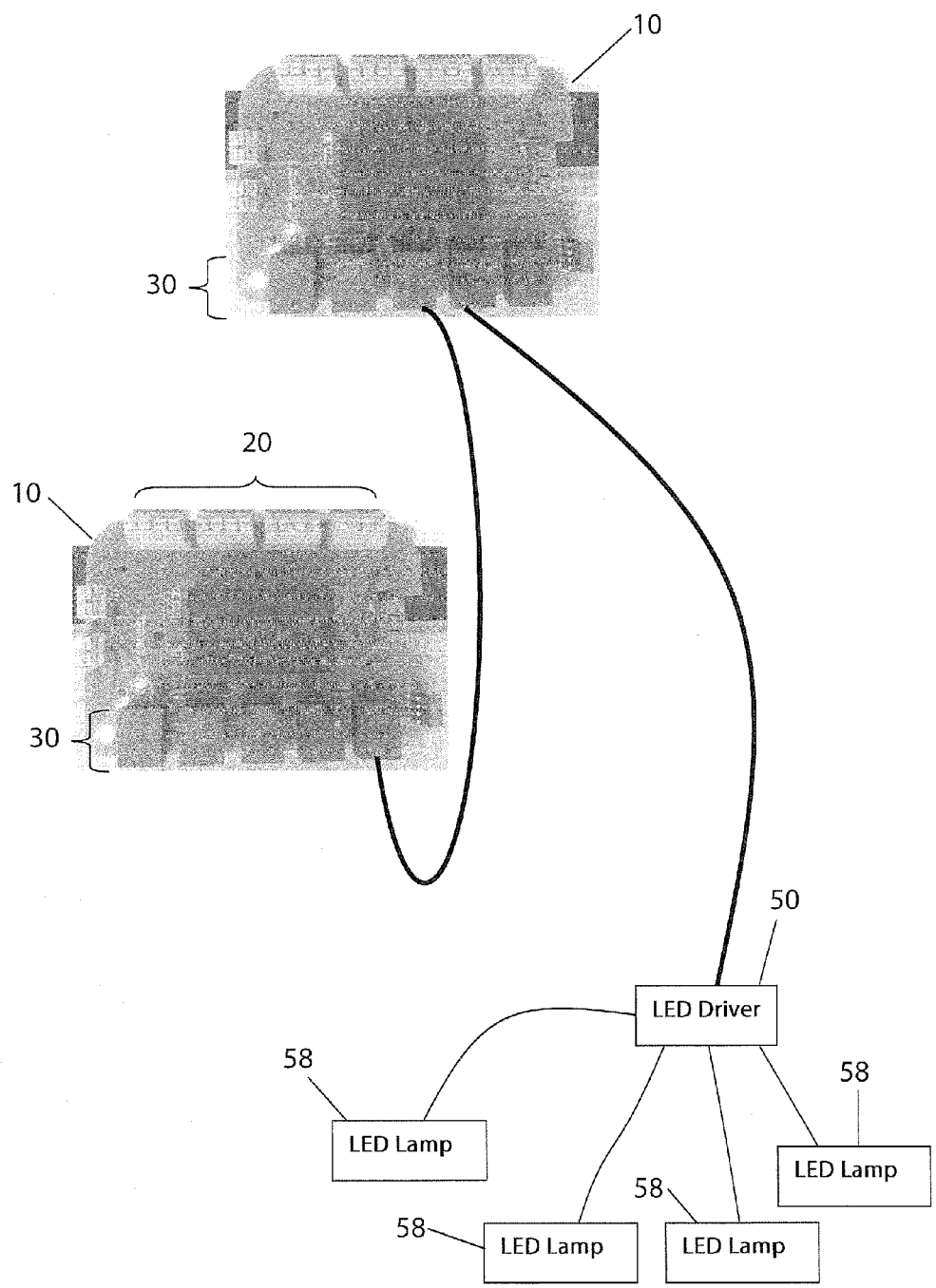
FIG. 7 shows a possible circuit implementation of FIG. 3.
Figure 8A:
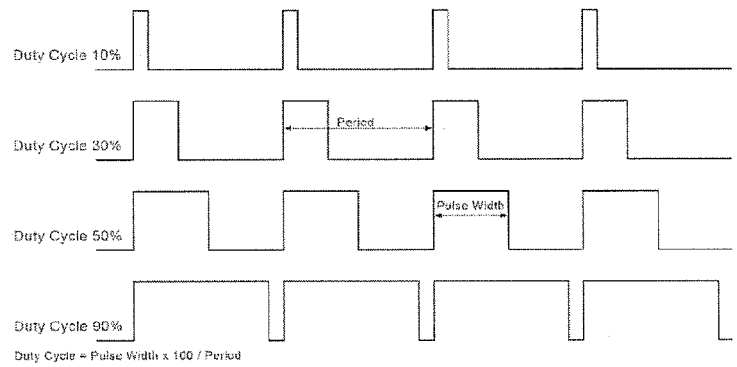
FIGS. 8a to 8c shows the possible inputs of the dimming protocols.
Figure 8B:
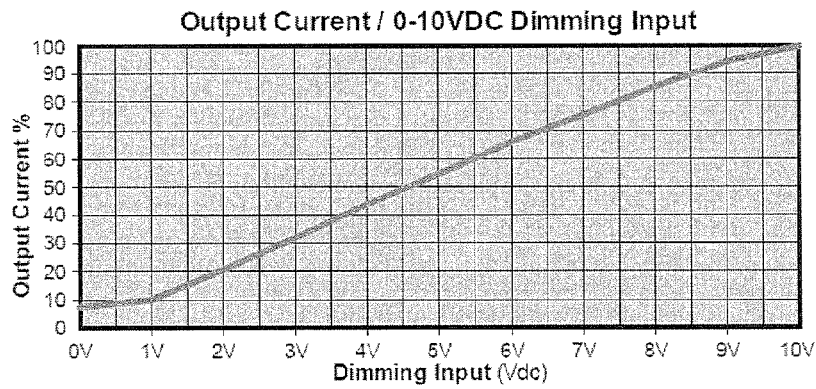
Figure 8C:
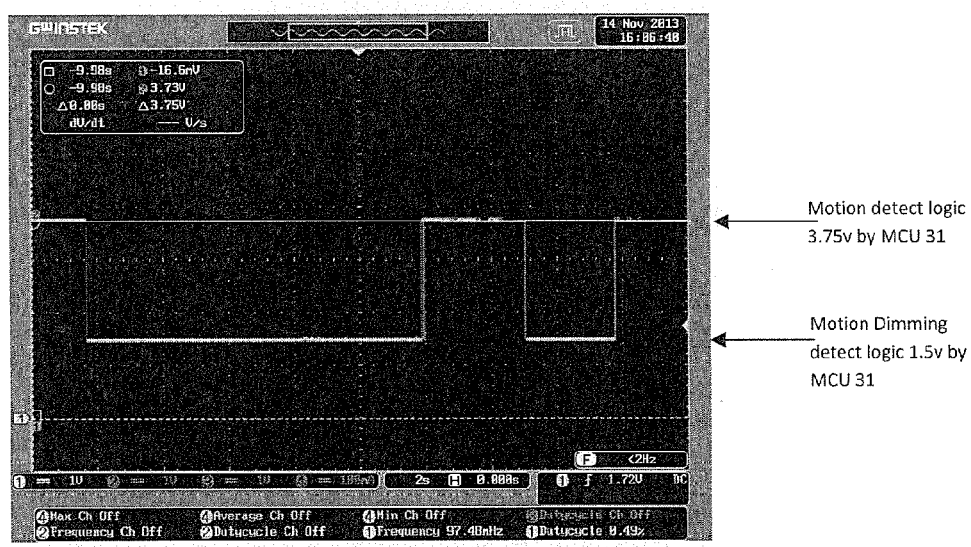

The flow chart in FIG. 5 describes the logic flow of the MCU 260, in particular differentiating the PWM, 0-10V/VR and Motion Sensor signals from one another.

With reference to FIG. 5, once MCU 260 detects high voltage level at both INPUT 2 and INPUT 3 in parallel, OUTPUT 2 will send 100% output signal to the LED ASIC driver to fully light up the lighting.

The LED ASIC driver as mentioned may be the LED driver as described in PCT patent publication WO2011/152795; or the high powered LED 'string driver' as described in PCT patent publication WO2013/066270 and their relevant governing equations.

The OUTPUT 2 of MCU 260 may also be a PWM output mode with external RC filter or DAC output mode sending dimming voltage reference value to the input of ASIC.

The $REG_2$ is purely working as DC voltage regulator only. The MCU 260 INPUT 2 pin configured as PWM signal detection only as described. Any DC voltage will be ignored.

In accordance with another embodiment of the invention, the dimmer 10 as described in the earlier embodiment is combined with or arranged to work with a LED driver 50 for varying brightness to LED load. LED driver 50 is typically of an isolated configuration comprising a primary circuit 52, semiconductor based isolation 54, and secondary circuit 56. Secondary circuit 56 operably drives an LED load 58.

Primary circuit 52 comprises the rectifier circuitry for converting the AC source current/voltage to DC current/voltages suitable for driving LED loads. Semiconductor based isolation circuit 54 typically comprises a transformer, such as a planar transformer for isolating the primary circuit 52 from the secondary circuit 56. Secondary circuit 56 comprises smoothing capacitors and has at least an input/output interface 60 for receiving the dimming hub 10 dimmer input(s) for adjusting the output voltage/current to the LED load 58. I/O interface 60 may be an integrated circuit (IC) such as an application-specific integrated circuit (ASIC). The ASIC driver may be the LED driver as described in PCT patent publication WO2011/152795; or the high powered LED 'string driver' as described in PCT patent publication WO2013/066270 and their relevant governing equations.

LED load 58 comprises a plurality of LED lights.

In another preferred embodiment of the invention, the dimmer 10 as described is combined with a high powered LED lamp driver 50 suitable for driving a plurality of high powered LED lamp units 58. Such a single driver 50 possesses the quality of producing suitable ripple less DC current for providing to a plurality of high powered LED lamps such that each high powered LED lamp unit 58 does not require a dedicated driver. As a result of a single driver to multiple LED lamp units, each high powered LED lamp unit may be fitted with a suitable heat sink to dissipate heat from the high powered LED lamp unit alone.

The output interface 30 of each dimmer 10 is suitably connected to one or more of such LED lamp units, or to additional dimmers 10.

The dimming hub enables it to work with single driver which can potentially dim an unlimited number of strings of lights.

An application of the described dimmer 10 with combination with a single high powered LED lamp driver suitable for driving a plurality of high powered LED lamp units is as a corridor dimming solution. This is particularly useful in hotel/condominium corridors installed with LED lights. The application is described in the context of using of motion sensor as the operative input interface 20.

In a typical hotel corridor where lights are on all the time, when there is no motion the strings of LED light in the entire corridor dims down to say 30% at an 'energy saving' mode.

When motion is detected (i.e. when a person approaches the corridor and is detected by one or more motion sensors, the string of lights goes up to 100% brightness.

The advantages associated with the described embodiments are listed as follows;

i. In the LED driver implementation, due to the connection with the secondary circuitry; the primary circuitry including the AC input source is not affected and hence the input current waveform is not distorted. Such an arrangement is further advantageous because it minimizes distortion, noise, flickering and EMI in the primary circuit.

In addition, the dimming hub comprises an input interface that can integrate more than one LED dimming protocols including protocols such as potentiometers, PWM and motion sensors (which may include PWM signals within certain frequency range such as 2.5 kHz to 3 kHz).

Comparing with a conventional dimmer such as a TRIAC dimmer, the TRIAC dimmer generally comprises the following problems.

The voltage chopping and triggering of triac at line frequency will generate inrush current, electromagnetic interference, and audible noise.

The chopped-off current waveform is severely distorted and results in:
(a) Poor power factor
(b) Poor line regulation
(c) Distorted current waveform
(d) Inrush current and EMI noise.

It would be further appreciated that although the invention covers individual embodiments, it also includes combinations of the embodiments discussed. For example, any feature(s) described in one embodiment not being mutually exclusive to a feature described in another embodiment may be combined to form yet further embodiments of the invention.

The invention claimed is:

1. A dimmer system comprising
one input interface capable of receiving a dimming input from at least two dimming protocols; the dimming input in the form of either a pulse wave modulation (PWM) signal or a direct current (DC) voltage signal;
an input processer operable to receive the dimming input from the input interface and differentiate the received dimming protocol based on whether the received dimming input is the PWM signal or the DC voltage signal, and process the dimming input according to the dimming protocol; and
an output interface comprising a plurality of output ports, at least one output port adapted to transmit the processed dimming input to at least one LED driver;
wherein the at least one LED driver is operable to drive a plurality of high powered LED lamp units at a desired brightness in accordance with the processed dimming input,
wherein the at least two dimming protocols comprise at least two of the following: a Digital Addressable Lighting Interface (DALI); a potentiometer for varying from 0-10 electrical volts; and a motion sensing control protocol; and
wherein where the dimming protocol is the motion sensing control protocol, there comprises a timer to determine a duration the high-powered LED lamp units are to remain at a desired brightness.

2. The dimmer system according to claim 1, wherein the plurality of output ports comprises a plurality of RJ45 Ethernet modular connectors.

3. The dimmer system according to claim 1, wherein the input processor comprises a main control unit operable to receive the dimming input and provide the output in the form of a PWM signal with a duty cycle.

4. The dimmer system according to claim 3, wherein the input processor further comprise a PWM convertor and in operation, upon receiving the PWM signal with the duty cycle to operate the PWM converter, the PWM signal is converted to an operating DC voltage and sent to the output interface.

5. The dimmer system according to claim 4, wherein the operating DC voltage after conversion is around 1.5 to 5 volts.

6. The dimmer system according to claim 4, wherein the PWM signal frequencies detected at a range between 100 Hz to 2 KHz is determined as a normal PWM signal; and the PWM signal frequencies detected at a range between 25 Hz to 80 Hz is determined as a motion sensor signal.

7. The dimmer system according to claim 4, wherein the PWM signal frequencies detected at a range between 100 Hz to 2 KHz is determined as a normal PWM signal; and the PWM signal frequencies detected at a range between 2.5 KHz to 3 KHz is determined as a motion sensor signal.

8. A lamp system comprising the dimmer system of claim 1 wherein the at least one output port is connected to the input interface of another dimmer system.

9. An electrical circuit comprising a dimmer system according to claim 1, wherein the dimmer system is implemented on a secondary end of the electrical circuit in a non-isolated configuration.

10. An electrical circuit comprising a dimmer system according to claim 1, wherein the dimmer system is implemented on a secondary end of the electrical circuit in an isolated configuration.

11. The dimmer system according to claim 1, wherein the input interface is adapted to receive dimming inputs from a PWM module, a potentiometer module, or a motion sensor interface.

12. The dimmer system according to claim 11, further comprises an input line for receiving dimming inputs from the PWM module, the potentiometer module and the motion sensor interface.

13. The dimmer system according to claim 12, wherein the dimming inputs received at the input line is sent to an input signal regulation unit.

14. The dimmer system according to claim 13, wherein the input signal regulation unit comprises a first input for the detection of PWM signal or motion sensor signal; and a second input for detection of potentiometer signal.

15. The dimmer system according to claim 14, wherein any DC signal received at the first input is disregarded and any AC signal received at the second input is disregarded.

16. A method for processing and providing dimming signals to an electrical output comprising the steps of:
receiving one dimming input from at least two dimming protocols, the dimming input in the form of a pulse wave modulation (PWM) signal or a direct current (DC) voltage signal;
differentiating the dimming protocol of the received dimming input based on whether the received dimming input is a PWM signal or the DC voltage signal and processing the dimming input according to the dimming protocol; and
transmitting the processed dimming input to at least one LED driver for dimming;
wherein the at least one LED driver is operable to drive a plurality of high powered LED lamp units at a desired brightness in accordance with the dimmer input, and
wherein where the dimming protocol is a motion sensing control protocol, there comprises a timer to determine a duration the high-powered LED lamp units are to remain at the desired brightness.

17. The method according to claim 16, wherein the at least two dimming protocols comprise at least two of the following: Digital Addressable Lighting Interface (DALI); potentiometer control varying from 0-10 electrical volts; and motion sensing control protocol.

* * * * *